United States Patent
Uddin et al.

(10) Patent No.: US 11,354,411 B2
(45) Date of Patent: Jun. 7, 2022

(54) MICROCONTROLLER PROGRAM INSTRUCTION EXECUTION FINGERPRINTING AND INTRUSION DETECTION

(71) Applicant: Robert Bosch GmbH, Stuttgart (DE)

(72) Inventors: Mesbah Uddin, Knoxville, TN (US); Stefan Gehrer, Pittsburgh, PA (US); Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 90 days.

(21) Appl. No.: 16/822,861

(22) Filed: Mar. 18, 2020

(65) Prior Publication Data

US 2021/0294893 A1    Sep. 23, 2021

(51) Int. Cl.
| | |
|---|---|
| *G06F 21/55* | (2013.01) |
| *G06F 21/70* | (2013.01) |
| *G06K 9/62* | (2022.01) |
| *H05K 1/02* | (2006.01) |
| *G06N 20/00* | (2019.01) |
| *G06F 8/654* | (2018.01) |

(52) U.S. Cl.
CPC ............ *G06F 21/556* (2013.01); *G06F 8/654* (2018.02); *G06F 21/70* (2013.01); *G06K 9/6256* (2013.01); *G06N 20/00* (2019.01); *H05K 1/0268* (2013.01)

(58) Field of Classification Search
CPC ........ G06F 21/556; G06F 8/654; G06F 21/70; G06N 20/00; G06K 9/6256; H05K 1/0268
See application file for complete search history.

(56) References Cited

U.S. PATENT DOCUMENTS

| | | | |
|---|---|---|---|
| 8,332,945 B2 | 12/2012 | Kim et al. | |
| 9,258,604 B1* | 2/2016 | Bilobrov | H04N 21/466 |
| 10,977,367 B1* | 4/2021 | Adler | G06F 21/572 |
| 2018/0173877 A1 | 6/2018 | Guri et al. | |
| 2019/0230113 A1* | 7/2019 | Al Faruque | G06F 21/10 |
| 2021/0097186 A1* | 4/2021 | Mandal | G06F 21/554 |

OTHER PUBLICATIONS

M. Sahidullah and G. Saha, "Design, Analysis and Experimental Evaluation of Block-Based Transformation in MFCC Computation for Speaker Recognition," Speech Communication, vol. 54, No. 4, pp. 543-565, 2012.

* cited by examiner

*Primary Examiner* — Saleh Najjar
*Assistant Examiner* — Devin E Almeida
(74) *Attorney, Agent, or Firm* — Brooks Kushman P.C.

(57) ABSTRACT

Instruction classification and software intrusion detection is performed. Program instruction execution of a processor of a microcontroller unit (MCU) is monitored via side-channel signal analysis, the monitoring including capturing a signal trace of a physical property of the MCU that leaks information correlated with the program instruction execution of the MCU, the signal trace indicating a value of the physical property over time. From the signal trace, time domain features, frequency domain features, and Mel Frequency Cepstral Coefficients (MFCC) features are extracted. A model is utilized for instruction detection to identify an execution signature based on the time domain features, frequency domain features, and MFCC features. The execution signature is compared to one or more reference instruction signatures. A remedial action is performed responsive to the execution signature failing to match to the one or more reference instruction signatures.

20 Claims, 4 Drawing Sheets

MICROCONTROLLER PROGRAM INSTRUCTION EXECUTION FINGERPRINTING AND INTRUSION DETECTION

TECHNICAL FIELD

Aspects of the disclosure relate to an improved approach for fingerprinting a microcontroller unit (MCU) via analysis of a physical property of the MCU during execution of program instructions, as well as to performing intrusion detection based on the fingerprinting.

SUMMARY

According to one or more illustrative examples, a method for instruction classification and software intrusion detection includes monitoring program instruction execution of a processor of a microcontroller unit (MCU) via side-channel signal analysis, the monitoring including capturing a signal trace of a physical property of the MCU that leaks information correlated with the program instruction execution of the MCU, the signal trace indicating a value of the physical property over time; extracting, from the signal trace, time domain features, frequency domain features, and Mel Frequency Cepstral Coefficients (MFCC) features; utilizing a model for instruction detection to identify an execution signature based on the time domain features, frequency domain features, and MFCC features; comparing the execution signature to one or more reference instruction signatures; and performing a remedial action responsive to the execution signature failing to match to the one or more reference instruction signatures.

According to one or more illustrative examples, a system for instruction classification and software intrusion detection is described. The system includes a measurement device configured to monitor program instruction execution of a processor of an MCU, via side-channel signal analysis, to capture a signal trace of a physical property of the MCU that leaks information correlated with the program instruction execution of the MCU, the signal trace indicating a value of the physical property over time, the physical property of the MCU including one or more of voltage, power, sound, electromagnetic radiation, vibration, light, or heat. The system further includes an analysis device, in communication with the measurement device. The analysis device is programmed to receive, from the measurement device, the signal trace captured from the MCU; extract, from the signal trace, time domain features, frequency domain features, and MFCC features; utilize a model for instruction detection to identify an execution signature based on the time domain features, frequency domain features, and MFCC features; compare the execution signature to one or more reference instruction signatures; and perform a remedial action responsive to the execution signature failing to match to the one or more reference instruction signatures.

According to one or more illustrative examples, a non-transitory computer-readable medium including instructions for instruction classification and software intrusion detection that, when executed by an analysis device, cause the analysis device to perform operations including to receive, from a measurement device, a signal trace of a physical property of an MCU that leaks information correlated with a program instruction execution of the MCU, the signal trace indicating a value of the physical property over time, the physical property of the MCU including one or more of voltage, power, sound, electromagnetic radiation, vibration, light, or heat; extract, from the signal trace, time domain features, frequency domain features, and MFCC features; utilize a model for instruction detection to identify an execution signature based on the time domain features, frequency domain features, and MFCC features; compare the execution signature to one or more reference instruction signatures; and perform a remedial action responsive to the execution signature failing to match to the one or more reference instruction signatures, wherein the remedial action includes one or more of resetting buffers of the MCU, restarting the MCU, reflashing software of the MCU with a copy of the software retrieved from a read-only memory, disabling the MCU from a network, disabling interrupts of the MCU, or halting execution of the MCU.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Due to their enhanced connectivity with internal and external networks, automotive microcontroller units (MCUs) may be targets for attack by software or parameter modification. In the automotive world, such attacks, even for a short period of time, can be severe. Thus, run-time detection of such attacks is vital to automotive safety and security.

A processor-based system may leak information via side-channels. These side-channels may include power consumption, electromagnetic emanation, or even audio. This disclosure relates to a novel and nonobvious technique that captures these side-channel leakages of information to improve the quality of techniques that attempt to mitigate malicious attacks. Wires and/or sensors may be used to measure the power consumption or other physical properties of the MCU under consideration. In some implementations, the described approaches requires no software or hardware modification of the devices to be measured.

During a profiling stage, valid programs are executed to build a database of their individual signatures. Different or modified programs, not profiled in the database, should ideally have different characteristics and thus generate different signatures. The signatures or features of the profiles to verify the validity of a program running on the MCU need to be carefully chosen and should differ significantly even if any single operation is changed within a valid program. The disclosed approach indicates how to calculate and choose such features to increase the efficiency of an intrusion detection system.

At runtime, signatures are extracted from the real-time measurements and compared with the reference execution signatures calculated from training measurements taken during a profiling stage. By continuously monitoring the MCU under test, a low-level physical run-time intrusion detection may be performed through the comparison with these execution signatures.

It should be noted that many examples herein discuss use of the disclosed approach in vehicles that use ECUs or embedded processors (which is almost every motor vehicle today). In other examples, the approach can also be applied to industrial Internet of Things (IoT) devices (having a processor/microcontroller), and in general to any embedded system with a processor, which executes program instructions, where the program instruction execution is correlated to the power consumed by the processor during the execution of the program. It should also be noted that, while many examples herein relate power consumption, this type of analysis can be done on other types of traces (or combinations of traces) that include side-channel leakages of information, such as for example, electromagnetic traces, sound traces, vibration traces, or any other physical measurement trace measured by a sensor device.

Figure 1:
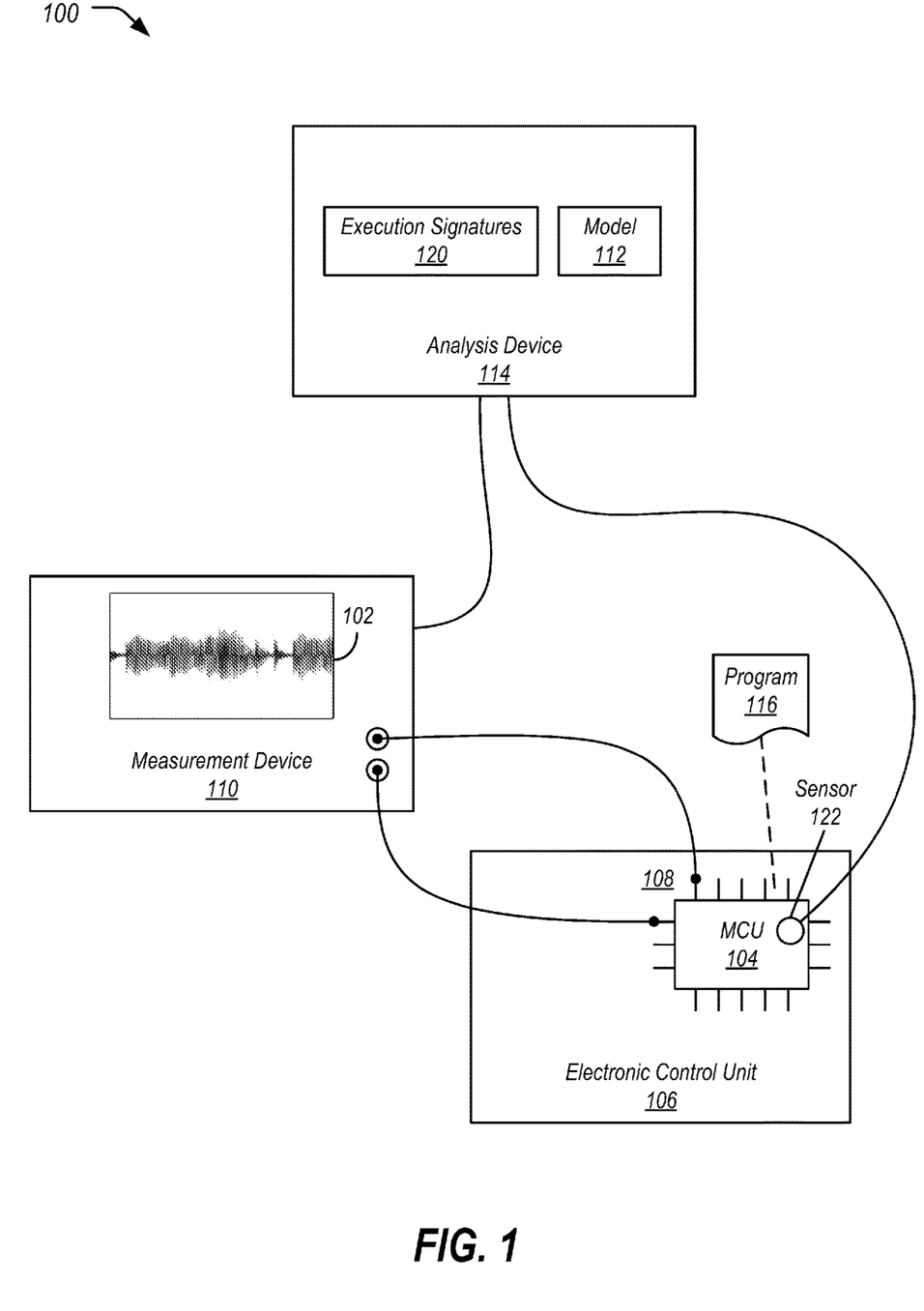
FIG. 1 shows an example system for the collection of signal traces that include side-channel leakages of information.

FIG. 1 shows an example system 100 for the collection of signal traces 102 that include side-channel leakages of information. As shown, a measurement device 110 is used to capture information over time to gather the side-channel leakages of information from an MCU 104 of an electronic control unit (ECU) 106. An analysis device 114 is connected to the measurement device 110. As explained in detail herein, the signal traces 102 are used by the analysis device 114 to train classifiers of a model 112 (profiling), where once trained, the model 112 is used to detect malicious modifications (which may be indicative of a security risk), or even unintended modifications of programs (which may be indicative of a safety risk). For instance, the model 112 may be used to compare the instructions executed by the MCU 104 with stored execution signatures 120 of known good software.

While only a single MCU 104 is shown in the example system 100, it should be noted that the described approach can be applied to a single MCU 104, a collection of MCUs 104 performing a single task, or for a plurality of MCUs 104 operating individually. It should also be noted that the analysis device 114 may be local to the MCU 104, or in other examples may be a remote computing system, such as a gateway in the vehicle to which the signal traces 102 are sent or a remote server external to the vehicle. It should further be noted that the analysis device 114 which is used to do the training of the model 112 and the analysis device 114 which is used to compare the trained model 112 and the measurement trace during verification may be different devices.

In one example, an improved and low-cost way of classifying high-level instructions running on the MCU 104 may be performed by using the power side-channel collected from a supply voltage pin 108. As shown, one example of such collection is accomplished by probing accessible pins 108 of the MCU 104. Two pins 108 from the MCU 104 (e.g., one VDD, one I/O) are connected to a measurement device 110 (e.g., an oscilloscope) for intrusion detection purposes using power side-channels. Such an approach utilizes a new method of probing an MCU 104 to perform a physical measurement of the MCU 104 that results in a trace that indicates a measurable change due to the specific programs running in the CPU of that MCU 104.

Other examples of the measurement device 110 may include an additional controller connected to the power pins of the MCU 104 under test, a hardware security module that has access to the power pin of the MCU 104 under test/observation that is available in the same package as the MCU 104 under test. This is important as many automotive ECUs 106 contain more than one MCU 104 in it, possibly one of them being a "secure" MCU 104, sometimes referred to as a hardware security module (HSM).

In many side-channel power-based attack or intrusion detection systems, to measure power, a small resistor of a few Ohms is inserted between the power supply and the supply voltage pin 108 (VDD) of the ECU 106 containing the MCU 104. In the case of the automotive MCU 104, the MCU 104 is usually just one part of a board containing other components, such as ADCs (analog-to-digital converters), FFT (fast Fourier transform) blocks, a CAN (controller area network) controller, and/or an I/O (input-output) controller. A power supply of a first voltage (e.g., 12 Volts in many examples) may be used for the board, while the MCU 104 may run off a second voltage (e.g., 1.2 Volts VDD in many examples), which the MCU 104 receives from a power converter on the board that converts the first voltage into the second voltage. In another example, the MCU 104 generates the second voltage itself. Thus, if measurement is made of current and power from the first voltage line, that signal would contain power consumption not only from the MCU 104, but also from other components on the board as well. Therefore, such data would be noisy and difficult to use for classifying programs 116 being executed by the MCU 104.

The second voltage power supplied to the MCU 104 may be difficult to measure non-intrusively by attaching an in-line shunt resistor. However, there are some locations where it is possible to probe the internal second voltage power rail of the MCU 104. If any programs 116 are run by the MCU 104, then any fluctuation of the second voltage on the VDD pin 108 would contain information about the dynamic and static power consumption related to those programs 116. Therefore, instead of using a resistor to measure power, the second voltage pin 108 may instead be probed to measure voltage variation due to different instructions running in the CPU of the MCU 104. Optionally, one I/O pin 108 of the MCU 104 can be used as an external trigger (very commonly not all I/O pins 108 of a microcontroller are being used). It is not straightforward from the power trace to know where a desired program 116 starts and ends execution. For that purpose, the MCU 104 can toggle the state of one I/O pin 108 at the beginning and end of execution of the program 116. Thus, if the program 116 is being run continuously, the trace between two consecutive I/O toggles would be the region where the program 116 starts and ends execution. Both of these techniques, moving to second voltage pin 108 and using an I/O pin 108 as a hardware trigger help to improve classification accuracy from side-channel power signal traces 102 as compared to previous techniques of using a series resistor to measure power. It should be noted that other triggers may be used to control the tracing. For instance, the capturing of the signal traces 102 may be triggered by one or more hardware or software interrupts of the MCU 104 being monitored. One possible example could be an interrupt that is requested by a scheduler, that initiates a context switch to another process or program or thread. In the interrupt service routine, an external port may be triggered to inform the measurement device 110 about the context switch. This would allow, for example, for tracing to be done per process, program, or thread.

As has been noted, power supply voltage is one example of a device measurement of a physical property of the MCU 104 that may be used to generate a signal trace. It should be mentioned that other measurements and/or other physical properties may be used as well, such as sound (e.g., as measured using a microphone), vibration (e.g., as measured using a MEMS sensor), a trace from an electromagnetic probe, and so on.

For instance, an external or internal sensor 122 may additionally or alternately be utilized to provide a device measurement of another physical property (e.g., sound, temperature) to perform an initial baseline measurement (profiling). This additional or alternate measurement can be performed to aid in identifying features that give the maximum separation among physical properties (e.g., power consumption, heat dissipation, sound, etc.) of different MCU 104 instructions or functions (i.e., a set of instructions). Then, classifiers (e.g., suitable machine learning algorithms or neural networks) of the model 112 can be used on these computed features to quickly identify running instructions and thus allow fast intrusion detection.

With respect to feature extraction, signal traces 102 containing thousands or even millions of sample points are usually too large and computationally expensive to feed directly into any classification model 112. Furthermore, most machine learning algorithms require pre-processing to learn details about frequencies, sampling rate or other relevant information about the hardware. Instead of using principal component analysis (PCA) to blindly reduce dimensionality of the data, some useful features are extracted such that these extracted features are used to train the model 112 classifier. Some commonly-used features are average trace power, maximum power, minimum power, statistical properties of a trace such as standard deviation, skewness, kurtosis and root mean square (RMS) power. Also, frequency domain features such as band-energies are used as some frequencies could be highly correlated to a particular instruction or a set of instructions being executed by a program 116.

The approach uses unique features in a classification learner of the model 112, which provide improved accuracy compared to features previously used in these types of systems for intrusion detection. Specifically, the described approach uses Mel frequency cepstral coefficient (MFCC) as additional features for the model 112, which improves the testing and training accuracy of several machine learning models 112 by 5%-10% compared to cases when MFCC features are not being used. MFCCs are discussed in detail in M. Sahidullah et al. (M. Sahidullah and G. Saha, "Design, analysis and experimental evaluation of block-based transformation in MFCC computation for speaker recognition," *Speech Communication*, vol. 54, no. 4, pp. 543-565, 2012).

MFCCs are primarily used for speech signal processing, where the frequency bands are not equally spaced in regular frequency domain. Rather, the frequency bands are equally spaced in the Mel scale (modified frequency domain) to get a better representation of the human auditory system. Even though the signals being analyzed in the described approach are not speech signals, the use of MFCCs as features shows an improvement on the range of 5%-15% in classification accuracy, especially for single instruction classification. After analyzing the features in an example test, it was identified that solely using the 10th (out of 13 in the test) MFCC contributes to over 10% of the classification accuracy, which is significant considering the example test utilized 35 features in total.

Figure 2:
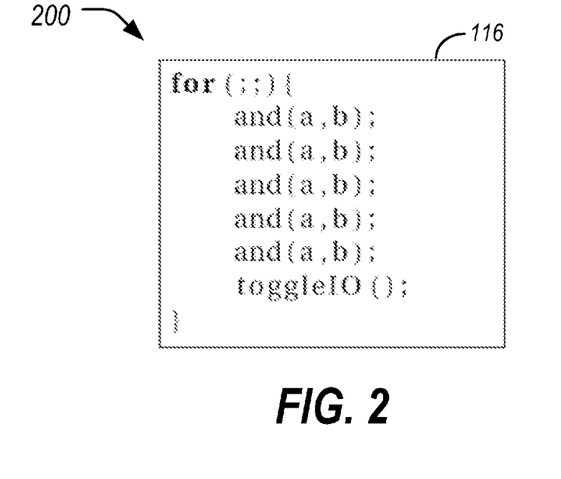
FIG. 2 shows an example program for generating trace data with respect to a single instruction.

FIG. 2 shows an example program 116 for generating signal trace 102 data with respect to a single instruction. As shown, the single instruction is the 'and' instruction. Using such a program 116, traces may be collected for the 'and' instruction. Similar programs 116 using each instruction multiple times in a loop (e.g., five times as shown) may also be used to collect traces for other instructions, such as 'add, 'multiply, 'left shift', 'right shift', 'or', and 'xor'. In doing so, representative signal traces 102 may be collected for each of a set of instructions. Then, time domain features and frequency domain features of the signal traces 102 can be extracted, as discussed herein. Additionally, MFCC features can also be calculated.

During the run-time of the ECU 106 in the field, side-channel power measurements (or other physical properties) can be done at a specific time window. Then features or execution signatures are calculated from this measurement and compared with the stored execution signatures 120 for known programs 116 that run on the MCU 104. From this comparison, the instructions or functions running in the current program 116 may be found, and thus any unintended instructions due to any malicious software modification can be detected at a very low level. By incorporating additional steps as remedial actions, such as resetting buffers of the MCU 104, restarting the processor of the MCU 104, reflashing the MCU 104 software with a copy of software that is retrieved from a read-only memory, disabling the ECU (MCU 104) from the network until further notice, disabling interrupts, halting the processor, and/or issuing an alert, the intrusion detection system can, accordingly, be helpful in preventing such malicious program 116 runs (intrusion prevention).

Classification techniques, such as Support Vector Machines (SVMs) with different kernels, (deep) neural networks, ensemble models, tree-based classifiers, etc., can be used for instruction classification and thus robust detection of software intrusion.

Variations on the described approach are possible. As one possible variation, the measurements can be transmitted to any external dedicated device or intrusion detection system (IDS) which is potentially more powerful and trustworthy.

As another possibility, as well as classifying individual instructions, complex and critical programs can be fingerprinted as a whole. Such sensitive applications can be made to go through a verification step with this intrusion detection method to actively prevent any threat caused by any malicious modifications.

As yet a further possibility, remote data collection and verification methods could be added. This would help to update the fingerprint database from time to time to keep up with any changes in power consumption caused by environmental change, process variation or aging. Remote verification methods can be added which, when triggered, would cause a sequence of instructions to be executed for fingerprinting and then a network intrusion detection system (IDS) can send a response to certify the validity of all these instructions.

Figure 3:
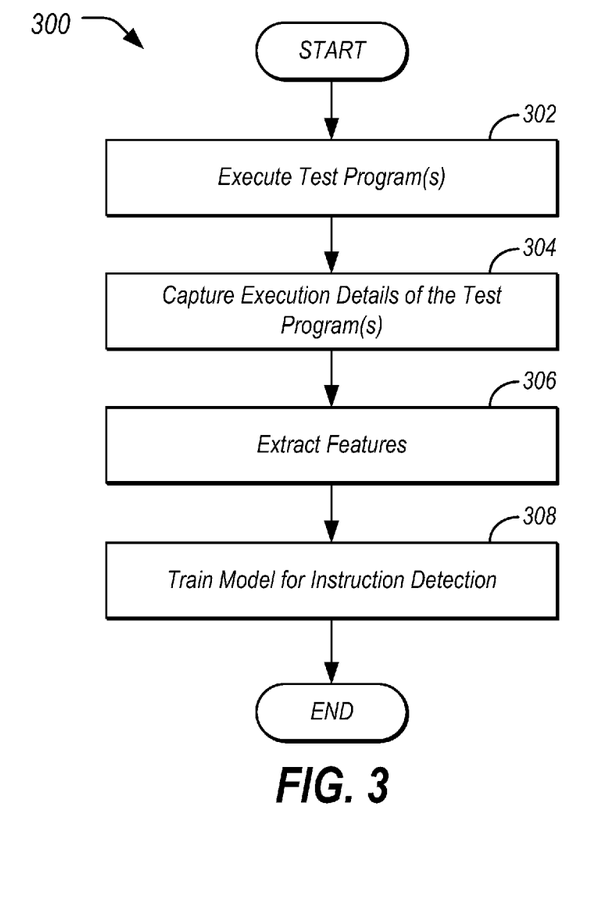
FIG. 3 illustrates an example process for the training of the model in instruction detection.

FIG. 3 illustrates an example process 300 for the training of the model 112 in instruction detection. In an example, the process 300 may be performed by an analysis device 114, in the context of the system 100.

At operation 302, a test program 116 is executed. An example of such a program 116 is shown in FIG. 2. The test program 116 may be executed by a processor of the MCU 104.

At operation 304, execution of the MCU 104 by the test program 116 is monitored to capture execution details of the operation of the MCU 104. For instance, a power trace is captured by a measurement device 110 connected to one or more pins of the MCU 104. In some examples, additional or alternate physical measurement may be performed using data received from the sensor 122. These execution details are received by the analysis device 114.

At operation 306, features are extracted. In an example, the analysis device 114 extracts features, which may include one or more of average trace power, maximum power, minimum power, statistical properties of a trace such as standard deviation, skewness, kurtosis, RMS power, band-energies, and MFCCs.

At operation 308, the model 112 is trained. In an example, the analysis device 114 trains the model 112 based on the extracted features and the known instructions of the test program 116. After operation 308, the process 300 ends. It should be noted that the process 300 may be performed for multiple test programs 116 to allow for increased coverage of possible instruction execution cases.

Figure 4:
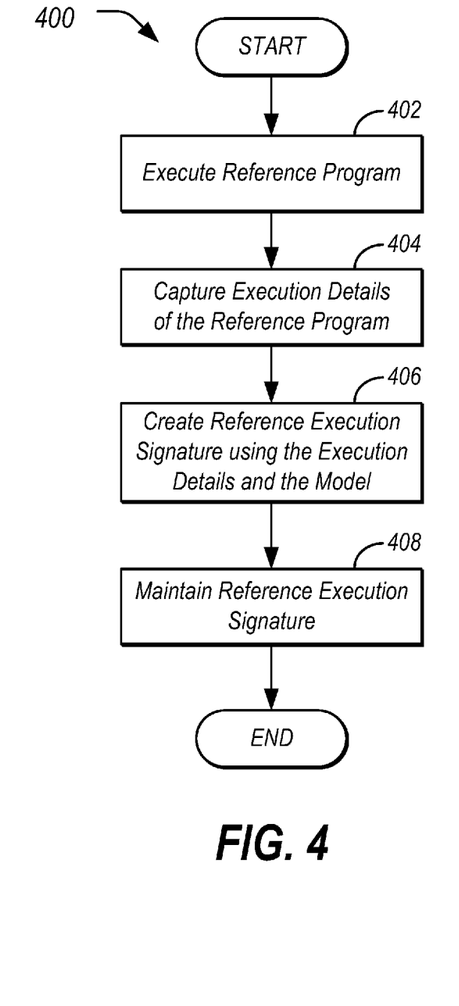
FIG. 4 illustrates an example process for the creation of reference execution signatures.

FIG. 4 illustrates an example process 400 for the creation of reference execution signatures 120. In an example, as with the process 300, the process 400 may be performed by the analysis device 114 in the context of the system 100. At operation 402, a reference program 116 is executed. Specifically, the reference program 116 may be executed by a processor of the MCU 104.

At operation 404, execution details of the reference program 116 are captured. In an example, and similar to as discussed above with respect to operation 304 of the process 300, physical measurements of the MCU 104 may be performed to generate a signal trace 102 of execution of the program 116 being captured.

At operation 406, a reference execution signature 120 is created with respect to the execution of the program 116. In an example, the model 112 (e.g., as trained according to the process 300), may be used to create the execution signature 120 using the execution details captured at operation 404 as input. After operation 406, the process 400 ends.

It should be noted that in some examples the reference execution signature 120 can be stored in non-tamperable storage to guarantee that the reference execution signatures 120 have not been modified at the time they are used for verification. Non-tamperable storage could be provided via a hardware secure module, storage in read-only memory, storage in a different device (considered to be secure), all or any of the above combined with a cryptographic signature or message authentication code (MAC) where the private key or secret key is stored in secure memory not accessible to an attacker.

Figure 5:
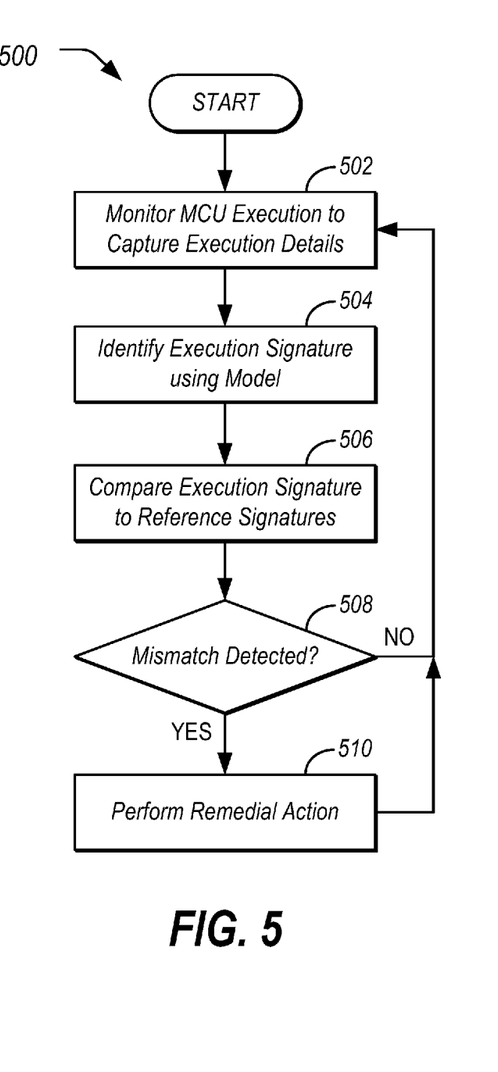
FIG. 5 illustrates an example process for the use of the model in software intrusion detection.

FIG. 5 illustrates an example process 500 for the use of the model 112 in software intrusion detection. In an example, as with the processes 300 and 400, the process 500 may be performed by the analysis device 114 in the context of the system 100.

At operation 502, execution of the MCU 104 is monitored to capture execution details of the operation of the MCU 104. In an example, and similar to as discussed above with respect to operations 304 and 306 of the process 300, physical measurements of the MCU 104 may be performed and/or a signal trace 102 of execution of the program 116 may be captured.

At operation 504, an execution signature 120 of the execution of the MCU 104 is identified. In an example, and similar to as discussed above with respect to operation 406 of the process 400, the model 112 (e.g., as trained according to the process 300), may be used to create the execution signature 120 using the execution details captured at operation 502 as input.

At operation 506, the execution signature 120 is compared to the reference execution signatures 120. At operation 508, it is determined whether the execution signature 120 matches that of the one or more reference execution signatures 120. For instance, comparison may include, for example, determining whether an amount of error between the execution signature 120 and the reference execution signatures 120 is within a maximum tolerance. If so, control returns to operation 502. Otherwise control passes to operation 510.

At operation 510, a remedial action is performed. As some examples, the remedial action may include one or more of resetting buffers of the MCU 104, restarting the processor of the MCU 104, reflashing the MCU 104 software with a copy of software that is retrieved from a read-only memory, disabling the ECU (MCU 104) from the network until further notice, disabling interrupts, halting the processor, and/or issuing an alert. After operation 510, if the processor is not halted control passes to operation 502. Otherwise, the process 500 ends.

Figure 6:
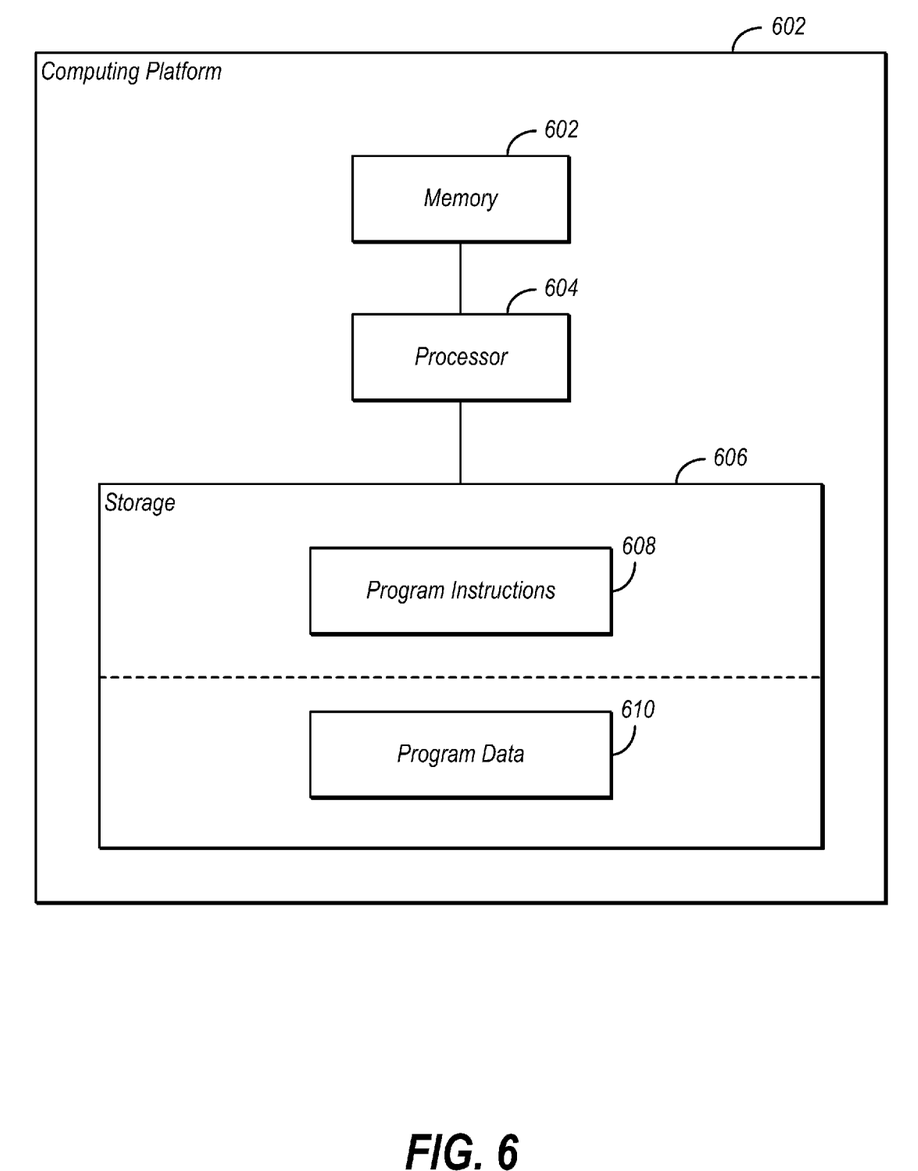
FIG. 6 illustrates an example computing device.

FIG. 6 illustrates an example computing device 600. The algorithms and/or methodologies of one or more embodiments discussed herein may be implemented using such a computing device. For instance, the analysis device 114 may be such a computing device 600. In another example, the measurement device 110, the MCU 104 and/or the ECU 106 may include or be such devices. The computing device 600 may include memory 602, processor 604, and non-volatile storage 606. The processor 604 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 602. The memory 602 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 606 may include one or more persistent data storage devices such as a hard drive, optical drive, tape drive, non-volatile solid-state device, cloud storage or any other device capable of persistently storing information.

The processor 604 may be configured to read into memory 602 and execute computer-executable instructions residing in program instructions 608 of the non-volatile storage 606 and embodying algorithms and/or methodologies of one or more embodiments. The program instructions 608 may include operating systems and applications. The program instructions 608 may be compiled or interpreted from computer programs created using a variety of programming languages and/or technologies, including, without limitation, and either alone or in combination, JAVA, C, C++, C#, OBJECTIVE C, FORTRAN, PASCAL, JAVA SCRIPT, PYTHON, PERL, and PL/SQL.

Upon execution by the processor 604, the computer-executable instructions of the program instructions 608 may cause the computing device 600 to implement one or more of the algorithms and/or methodologies disclosed herein. The non-volatile storage 606 may also include data 610 supporting the functions, features, and processes of the one or more embodiments described herein. This data 610 may include, as some examples, signal traces 102, the model 112, the execution signatures 120, and the data from the sensor 122.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for instruction classification and software intrusion detection, the method comprising:
    monitoring program instruction execution of a processor of a microcontroller unit (MCU) via side-channel signal analysis, the monitoring including capturing a signal trace of a physical property of the MCU that leaks information correlated with the program instruction execution of the MCU, the signal trace indicating a value of the physical property over time;
    extracting, from the signal trace, time domain features, frequency domain features, and Mel Frequency Cepstral Coefficients (MFCC) features;
    utilizing a model for instruction detection to identify an execution signature based on the time domain features, frequency domain features, and MFCC features;
    comparing the execution signature to one or more reference instruction signatures; and
    performing a remedial action responsive to the execution signature failing to match to the one or more reference instruction signatures,
    where initiation and/or termination of capturing of the signal trace is triggered by one or more hardware or software interrupts of the MCU.

2. The method of claim 1, wherein the physical property of the MCU includes one or more of voltage, power, sound, electromagnetic radiation, vibration, light, or heat.

3. The method of claim 1, further comprising:
    executing a reference program;
    capturing a reference program signal trace from the MCU during execution of the reference program;
    extracting, from the reference program signal trace, reference program execution features including time domain features, frequency domain features, and MFCC features;
    utilizing the model for instruction detection to generate a reference program instruction signature for the reference program based at least in part on the reference program execution features; and
    adding the reference program instruction signature to the one or more reference instruction signatures.

4. The method of claim 1, wherein the remedial action includes one or more of resetting buffers of the MCU, restarting the processor of the MCU, reflashing software of the MCU with a copy of the software retrieved from a read-only memory, disabling the MCU from a network, disabling interrupts of the MCU, or halting execution of the MCU.

5. The method of claim 1, further comprising:
    executing one or more test programs on the MCU, the test programs executing predefined instructions of the MCU;
    receiving device measurements of one or more physical properties of the MCU during execution of the test programs, the physical properties including test program signal traces captured from the MCU during execution of the test programs;
    extracting, from the test program signal traces, test program time domain features, test program frequency domain features, and test program MFCC features; and
    training the model for instruction detection to identify execution of the predefined instructions utilizing the device measurements, test program time domain features, test program frequency domain features, and test program MFCC features.

6. A method for instruction classification and software intrusion detection, the method comprising:
    monitoring program instruction execution of a processor of a microcontroller unit (MCU) via side-channel signal analysis, the monitoring including capturing a signal trace of a physical property of the MCU that leaks information correlated with the program instruction execution of the MCU, the signal trace indicating a value of the physical property over time;

extracting, from the signal trace, time domain features, frequency domain features, and Mel Frequency Cepstral Coefficients (MFCC) features;

utilizing a model for instruction detection to identify an execution signature based on the time domain features, frequency domain features, and MFCC features;

comparing the execution signature to one or more reference instruction signatures; and performing a remedial action responsive to the execution signature failing to match to the one or more reference instruction signatures, wherein the signal trace is a power trace captured from one or more pins of the MCU, from a voltage supplying the MCU, from a ground connection of the MCU, or from an intermediate voltage regulator supplying the MCU.

7. The method of claim 6, wherein the one or more pins include a supply voltage pin of the MCU.

8. The method of claim 6, wherein the one or more pins include an I/O pin of the MCU to use as an external trigger for initiation and/or termination of capturing of the signal trace.

9. The method of claim 6, where initiation and/or termination of capturing of the signal trace is triggered by one or more hardware or software interrupts of the MCU.

10. A system for instruction classification and software intrusion detection, the system comprising:
a measurement device configured to monitor program instruction execution of a processor of an MCU, via side-channel signal analysis, to capture a signal trace of a physical property of the MCU that leaks information correlated with the program instruction execution of the MCU, the signal trace indicating a value of the physical property over time, the physical property of the MCU including one or more of voltage, power, sound, electromagnetic radiation, vibration, light, or heat; and
an analysis device, in communication with the measurement device, programmed to
receive, from the measurement device, the signal trace captured from the MCU;
extract, from the signal trace, time domain features, frequency domain features, and MFCC features;
utilize a model for instruction detection to identify an execution signature based on the time domain features, frequency domain features, and MFCC features;
compare the execution signature to one or more reference instruction signatures; and
perform a remedial action responsive to the execution signature failing to match to the one or more reference instruction signatures,
wherein initiation and/or termination of capturing of the signal trace is triggered by one or more hardware or software interrupts of the MCU.

11. The system of claim 10, wherein the analysis device is a hardware security module.

12. The system of claim 10, wherein the analysis device is a separate hardware device remote from the measurement device.

13. The system of claim 10, wherein the analysis device is further programmed to:
receive, from the measurement device, a reference program signal trace captured from the MCU during execution of a reference program;
extract, from the reference program signal trace, reference program execution features including time domain features, frequency domain features, and MFCC features;
utilize the model for instruction detection to generate a reference program instruction signature for the reference program based at least in part on the reference program execution features; and
add the reference program instruction signature to the one or more reference instruction signatures.

14. The system of claim 10, wherein the remedial action includes one or more of resetting buffers of the MCU, restarting the processor of the MCU, reflashing software of the MCU with a copy of the software retrieved from a read-only memory, disabling the MCU from a network, disabling interrupts of the MCU, or halting execution of the MCU.

15. The system of claim 10, wherein the analysis device is further programmed to:
receive device measurements of one or more physical properties of the MCU during execution of one or more test programs on the MCU, the test programs executing predefined instructions of the MCU, the one or more physical properties including test program signal traces captured from the MCU during execution of the test programs;
extract, from the test program signal traces, test program time domain features, test program frequency domain features, and test program MFCC features; and
train the model for instruction detection to identify execution of the predefined instructions utilizing the device measurements, test program time domain features, test program frequency domain features, and test program MFCC features.

16. The system of claim 10, wherein the measurement device is an oscilloscope.

17. A system for instruction classification and software intrusion detection, the system comprising:
a measurement device configured to monitor program instruction execution of a processor of an MCU, via side-channel signal analysis, to capture a signal trace of a physical property of the MCU that leaks information correlated with the program instruction execution of the MCU, the signal trace indicating a value of the physical property over time, the physical property of the MCU including one or more of voltage, power, sound, electromagnetic radiation, vibration, light, or heat; and
an analysis device, in communication with the measurement device, programmed to
receive, from the measurement device, the signal trace captured from the MCU;
extract, from the signal trace, time domain features, frequency domain features, and MFCC features;
utilize a model for instruction detection to identify an execution signature based on the time domain features, frequency domain features, and MFCC features;
compare the execution signature to one or more reference instruction signatures; and
perform a remedial action responsive to the execution signature failing to match to the one or more reference instruction signatures,
wherein the signal trace is a power trace captured from one or more pins of the MCU, from a voltage supplying the MCU, from a ground connection of the MCU, or from an intermediate voltage regulator supplying the MCU, wherein the one or more pins include one or more of a supply voltage pin of the MCU, or an I/O pin of the MCU to use as an external trigger for initiation and/or termination of capturing of the signal trace.

18. The system of claim 17, initiation and/or termination of capturing of the signal trace is triggered by one or more hardware or software interrupts of the MCU.

19. A non-transitory computer-readable medium including instructions for instruction classification and software intrusion detection that, when executed by an analysis device, cause the analysis device to perform operations including to:
receive, from a measurement device, a signal trace of a physical property of an MCU that leaks information correlated with a program instruction execution of the MCU, the signal trace indicating a value of the physical property over time, the physical property of the MCU including one or more of voltage, power, sound, electromagnetic radiation, vibration, light, or heat;
extract, from the signal trace, time domain features, frequency domain features, and MFCC features;
utilize a model for instruction detection to identify an execution signature based on the time domain features, frequency domain features, and MFCC features;
compare the execution signature to one or more reference instruction signatures; and
perform a remedial action responsive to the execution signature failing to match to the one or more reference instruction signatures, wherein the remedial action includes one or more of resetting buffers of the MCU, restarting the MCU, reflashing software of the MCU with a copy of the software retrieved from a read-only memory, disabling the MCU from a network, disabling interrupts of the MCU, or halting execution of the MCU,
wherein one or more of:
initiation and/or termination of capturing of the signal trace is triggered by one or more hardware or software interrupts of the MCU, or the signal trace is a power trace captured from one or more pins of the MCU, from a voltage supplying the MCU, from a ground connection of the MCU, or from an intermediate voltage regulator supplying the MCU.

20. The medium of claim 19, wherein instructions further cause the analysis device to perform operations including to:
receive, from the measurement device, a reference program signal trace captured from the MCU during execution of a reference program;
extract, from the reference program signal trace, reference program execution features including time domain features, frequency domain features, and MFCC features;
utilize the model for instruction detection to generate a reference program instruction signature for the reference program based at least in part on the reference program execution features;
add the reference program instruction signature to the one or more reference instruction signatures;
receive device measurements of one or more physical properties of the MCU during execution of one or more test programs on the MCU, the test programs executing predefined instructions of the MCU, the one or more physical properties including test program signal traces captured from the MCU during execution of the test programs;
extract, from the test program signal traces, test program time domain features, test program frequency domain features, and test program MFCC features; and
train the model for instruction detection to identify execution of the predefined instructions utilizing the device measurements, test program time domain features, test program frequency domain features, and test program MFCC features.

* * * * *